(12) United States Patent
Aslaksen et al.

(10) Patent No.: US 12,504,103 B2
(45) Date of Patent: Dec. 23, 2025

(54) CLAMP AND A METHOD OF CLAMPING A PAIR OF FLANGES

(71) Applicant: Aquamarine AS, Jørpeland (NO)

(72) Inventors: Håkon Aslaksen, Tau (NO); Ole Bokn, Jørpeland (NO); Vegard Oftedal, Jørpeland (NO); Helge Skjellevik, Jørpeland (NO)

(73) Assignee: Aquamarine AS, Jørpeland (NO)

( * ) Notice: Subject to any disclaimer, the term of this patent is extended or adjusted under 35 U.S.C. 154(b) by 0 days.

(21) Appl. No.: 18/560,022

(22) PCT Filed: Jun. 3, 2022

(86) PCT No.: PCT/NO2022/050123
§ 371 (c)(1),
(2) Date: Nov. 9, 2023

(87) PCT Pub. No.: WO2022/265513
PCT Pub. Date: Dec. 22, 2022

(65) Prior Publication Data
US 2024/0240735 A1  Jul. 18, 2024

(30) Foreign Application Priority Data

Jun. 17, 2021 (NO) .................................. 20210790

(51) Int. Cl.
*F16L 23/04*  (2006.01)
(52) U.S. Cl.
CPC .................................... *F16L 23/04* (2013.01)
(58) Field of Classification Search
CPC ......... F16L 21/06; F16L 21/065; F16L 23/04; F16L 25/06; F16L 25/065; F16L 25/08; E21B 17/046; E21B 17/0465

(Continued)

(56) References Cited

U.S. PATENT DOCUMENTS 3,796,448 A * 3/1974 Ringkamp .......... E21B 17/0465
175/323
4,288,116 A  9/1981 Schlienger
(Continued)

FOREIGN PATENT DOCUMENTS

RU  2703583 C1 * 10/2019

OTHER PUBLICATIONS

The International Search report and Written Opinion for Corresponding International Application No. PCT/NO2022/050123, dated Jul. 19, 2022.

(Continued)

*Primary Examiner* — Zachary T Dragicevich
*Assistant Examiner* — Alexander T Rufrano
(74) *Attorney, Agent, or Firm* — Andrus Intellectual Property Law, LLP

(57) ABSTRACT

A ring-shaped clamp and a method of using same, wherein the ring-shaped clamp is arranged to encircle and hold together a pair of mating flanges of two inter-connectable elements, wherein a body is provided with a throughgoing center opening arranged to accommodate the mating flanges, a groove is formed inside and being configured for holding a number of clamping dogs and a number of radially displaceable parking dogs, wherein each of the clamping dogs are provided with a pair of opposing, first slanted flange supporting flats arranged to supportingly rest on a portion of remote first flange periphery edges of the mating flanges, and each of the parking dogs are provided with one protrusion arranged to supportingly rest on a portion of one of the flanges when being in the active second position.

21 Claims, 5 Drawing Sheets

(58) Field of Classification Search
USPC .......................................................... 285/411
See application file for complete search history.

(56) References Cited

U.S. PATENT DOCUMENTS

| | | | | |
|---|---|---|---|---|
| 5,951,066 | A * | 9/1999 | Lane | E21B 33/03 |
| | | | | 285/364 |
| 8,430,433 | B2 * | 4/2013 | Maier | F04D 29/624 |
| | | | | 285/411 |
| 8,740,260 | B1 * | 6/2014 | Liew | E21B 17/046 |
| | | | | 285/364 |
| 10,612,319 | B2 * | 4/2020 | Nelson | F16L 15/08 |
| 10,890,283 | B2 * | 1/2021 | Surjaatmadja | F16L 23/003 |
| 11,802,641 | B2 * | 10/2023 | Stratulate | F16L 25/065 |
| 2014/0152005 | A1 | 6/2014 | Liew | |
| 2017/0292642 | A1 | 10/2017 | Pendleton | |
| 2022/0412487 | A1 * | 12/2022 | McMillan | E21B 17/0465 |

OTHER PUBLICATIONS

Norwegian Search Report for Corresponding Norwegian Application No. 20210790, dated Dec. 22, 2021.

* cited by examiner

CLAMP AND A METHOD OF CLAMPING A PAIR OF FLANGES

CROSS-REFERENCE TO RELATED APPLICATIONS

This application is the U.S. national stage application of International Application PCT/NO2022/050123, filed Jun. 3, 2022, which international application was published on Dec. 22, 2022, as International Publication WO 2022/265513 in the English language. The International Application claims priority of Norwegian Patent Application No. 20210790, filed Jun. 17, 2021. The international application and Norwegian application are both incorporated herein by reference, in entirety.

FIELD

The invention concerns a ring-shaped clamp arranged to encircle and hold together a pair of mating flanges of two inter-connectable elements. The invention also concerns a method for clamping a pair of flanges.

BACKGROUND

In the industry operating flow lines designed for high pressure fluids, e.g. the oil and gas industry, the use of flanged conduit component is widely used. The so-called API (American Petroleum Institute) flanges have been used for decades, defining dimension standards for flanges and corresponding clamps used to connect and secure the flange couplings.

The clamp according to the invention is particularly suitable for clamping a pair of so-called API Hubs, such as a pair of API 16A Hubs, which is a type of flange without bolt holes through a face of the flange. However, the clamp according to the invention may also be used for flanges provided with bolt holes. Thus, in this document the term "flange" includes an API Hub.

An API clamp is made of two identical semi-circular sections provided with adequate coupling details. The API flange and clamp system is often used in wellheads of hydrocarbon wells, wherein the mostly used conduit diameters are 13⅝" and 18¾". The clamps suitable for such dimensions are heavy, and the assembly of a clamp about a pair of opposing flanges is demanding. Still a challenge is the lack of axial space about a flange connection, hindering the access of installation tools.

SUMMARY

The invention has for its object to remedy or to reduce at least one of the drawbacks of the prior art, or at least provide a useful alternative to prior art.

The object is achieved through features, which are specified in the description below and in the claims that follow. The invention is defined by the independent patent claims. The dependent claims define advantageous embodiments of the invention.

It has been realised that a ring-shaped clamp can be provided, wherein a ring-shaped body is provided with a throughgoing axial centre opening arranged to accommodate a pair of opposing flanges of components to be inter-connected. A groove is formed inside the body and is arranged co-axial with the centre opening. A number of groups of clamping segments are located in the groove, the groups of clamping segments being separated by parking segments. The clamping segments and the parking segments are radially displaceable in the groove. Preferably, end flats of the clamping segments and the parking segments are supported by opposing sidewalls of the groove.

In what follows, the clamping segments and the parking segments are denoted clamping dogs and parking dogs, respectively.

In a first aspect, the invention relates more particularly to a ring-shaped clamp arranged to encircle and hold together a pair of mating flanges of two inter-connectable elements, wherein the ring-shaped clamp comprises a body provided with a throughgoing centre opening arranged to accommodate the pair of mating flanges, and the body comprises a groove formed inside the body, the groove co-axially facing the centre opening.

The groove holds a number of clamping dogs arranged in groups, wherein adjacent groups of the clamping dogs are separated by a parking dog, each of the clamping dogs and each of the parking dogs being radially displaceable between a passive first position, and an active second position, each of the clamping dogs are provided with a pair of opposing, first slanted flange supporting flats arranged to supportingly rest on a portion of remote first flange periphery edges of the mating flanges when being in the active second position, and each of the parking dogs are provided with one protrusion arranged to supportingly rest on a portion of one of the flanges when being in the active second position.

Each of the clamping dogs and the parking dogs may be radially displaceable by individual linear actuators provided in the body. An effect of this is that the displacement of the dogs can be set individually for each dog. g The clamping dogs may be arranged in at least two, preferably three, groups. An effect of arranging the clamping dogs in three groups is that the three parking dogs separating the groups of clamping dogs form a tripod providing a load applied to the parking dogs being equalized. Preferably, the groups comprise an equal number of clamping dogs.

The groove may comprise parallel sidewalls arranged to provide axial support to the clamping dogs and the parking dogs. An effect of this is that the dogs are precisely guided during the displacement and provides an axial support for the dogs when subject to axial forces when being in their active second position.

Each parking dog may comprise a second flange supporting flat that may be slanted and arranged to supportingly rest on a portion of the first flange periphery edge of one of the flanges. An effect of this is that the centre axis of the clamp can be adjusted to coincide with the centre axis of the connected element.

Each of the clamping dogs and the parking dogs may be radially displaceable by individual linear actuators formed by screws engaging with internal threads in radial bores provided in the body. An effect of this is that the clamping can be performed with the use of standard tools.

Alternatively, the screws may engage with internal threads in replaceable sleeves arranged in radial bores provided in the body. An effect of this is that any damaged threads can be easily repaired by replacement of components.

In an alternative embodiment of the invention, the linear actuators may comprise fluid operated actuators, typically hydraulically operated pistons, configured for displacing the dogs between their active and passive positions. The hydraulically operated pistons may be configured for being operated in groups of at least two. The fluid operated actuators may be operated via a control system. For safety reasons, the fluid operated actuators may be provided with a mechanical locking system to prevent unintended release of the parking dogs and the clamping dogs when these are in their active second position.

The linear actuators may comprise T-shaped end portions arranged to engage with respective T-slots provided in the clamping dogs and parking dogs.

Each parking dog may be connected to two identical linear actuators. An effect of this is that a prescribed position of the parking dogs relative the axial direction of the clamp body may be obtained throughout the displacement of the parking dogs.

Each parking dog may be provided with one or more end stoppers arranged to define the inwardly radial displacement of the parking dog. An effect of this is that a precise displaced position of the parking dogs is obtained without an accurate operation of the parking dogs.

In a second aspect, the invention relates more particularly to a method for clamping a first flange forming part of a first element, to a second flange forming part of a second element, wherein the method comprises the steps:

a) providing a clamp according to the first aspect of the invention and arranging all clamping dogs and parking dogs in their passive first position,
b) orienting the clamp so that the protrusion of each parking dog is facing the flange to be gripped by the parking dog,
c) joining the clamp and the element comprising the flange to be gripped by the parking dogs by entering the flange into a centre opening of the body,
d) radially displacing the parking dogs to bring the protrusion of the parking dogs to supportingly rest on a portion of the first flange,
e) connecting the first element and the second element by entering the other one of the flanges into the centre opening of the clamp body, thereby mating the first flange and the second flange, and
f) radially displacing the clamping dogs to engagement of first slanted flange supporting flats of the clamping dogs with the remote first flange periphery edges of the mating flanges.

By reversing the steps of the installation, the clamp may be released from the pair of flanges.

The radial displacement of the parking dogs and the clamping dogs may be provided by operating individual linear actuators provided in the body. An effect of this is that the displacement of the dogs can be set individually for each dog.

The radial displacement of each parking dog may be provided by operating a second linear actuator and a third linear actuator to obtain a prescribed position throughout the displacement. An effect of this is that the prescribed position of the parking dogs relative the axial direction of the clamp body may be obtained throughout the displacement of the parking dogs.

BRIEF DESCRIPTION OF THE DRAWINGS

In the following is described examples of preferred embodiments illustrated in the accompanying drawings, wherein.

DETAILED DESCRIPTION OF THE DRAWINGS

Figure 1:
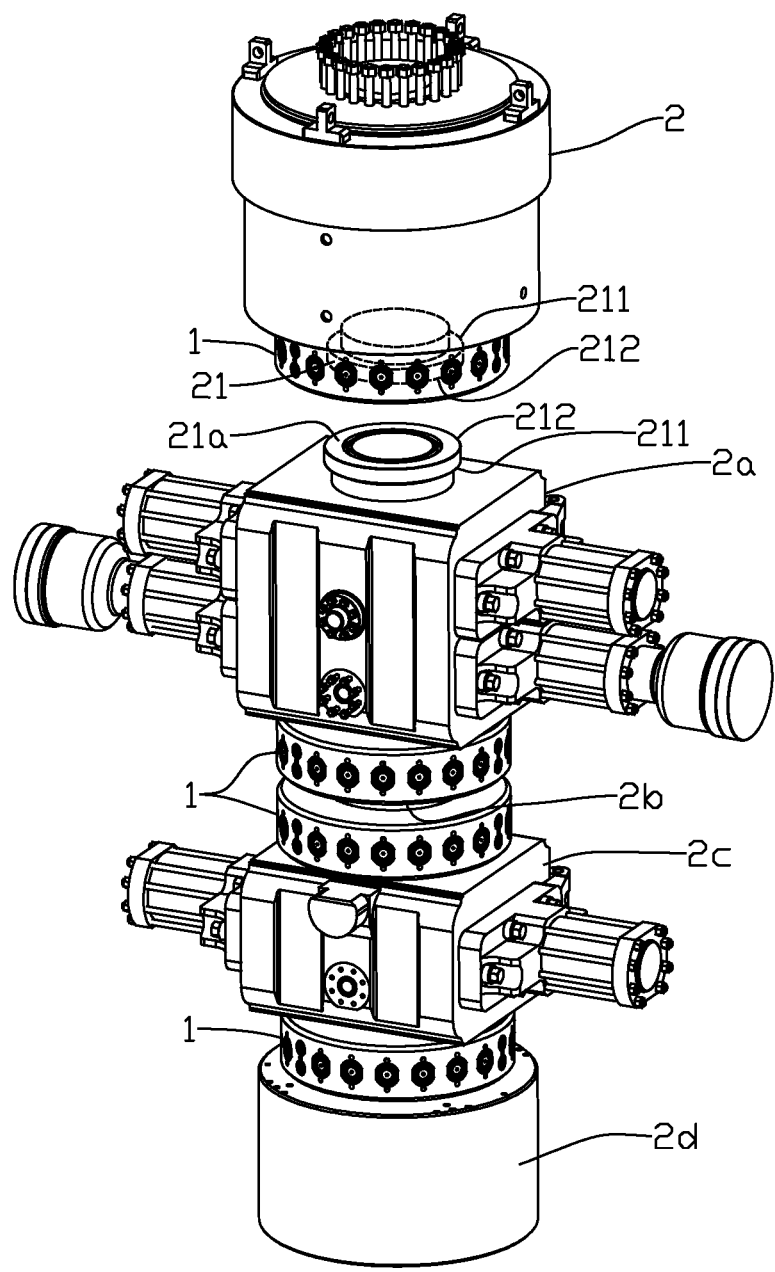
FIG. 1 shows in perspective view a valve tree configuration connected to a valve head, wherein several clamps according to the invention are installed and an upper valve tree section is in a position to be connected.
Figure 2:
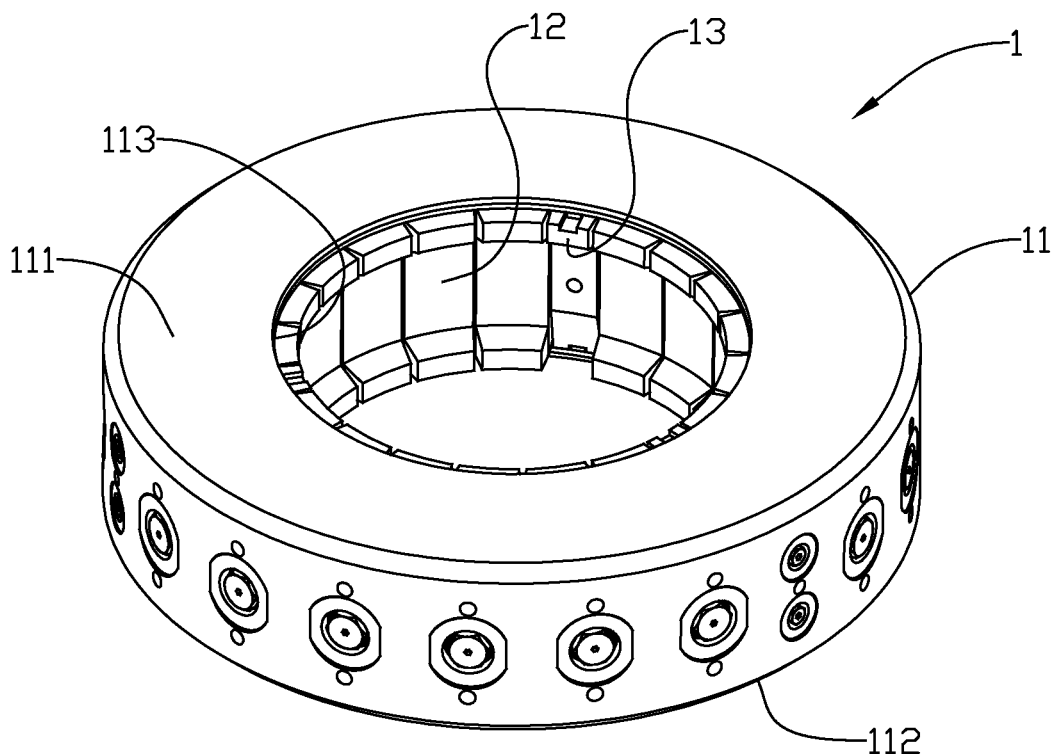
FIG. 2 shows the clamp according to the invention with parking dogs and clamping dogs in an activated state.

Any positional indications refer to the position shown in the figures.

In the figures, same or corresponding elements are indicated by same reference numerals. For clarity reasons, some elements may in some of the figures be without reference numerals.

A person skilled in the art will understand that the figures are just principal drawings. The relative proportions of individual elements may also be distorted.

The terms "axial" and "radial" and similar terms are related to the axial and radial directions of a centre opening of the clamp unless distinctly emphasized.

In FIG. 1 a stack of two elements 2a, 2b is held together by clamps 1 encircling opposing flanges (not shown) integrated in each of said elements 2a, 2b and forming a stack on a third element 2c, which may form an upper portion of a wellhead or the like. An additional element 2 is prepared for being connected to an upper flange 21a of the stack. An additional clamp 1 has been pre-connected to a lower flange 21 of said additional element 2. This pre-connection of the additional clamp is achieved by bringing parking dogs 13 from a passive position to an active position after enclosing the lower flange 21 by the additional clamp 1, as will be explained in more details below.

It is now referred to FIGS. 2, 3, 4 and 5 wherein a clamp 1 is shown in more details. The clamp 1 comprises a ring-shaped clamp body 11 with a through centre opening 113. Between a first end portion 111 and a second end portion 112 of the clamp body 11 a groove 114 (see FIGS. 3, 4 and 5) is provided inside the clamp body 11 co-axially with the centre opening 113, the groove 114 facing the centre opening 113.

The groove 114 holds several groups of clamping dogs 12, wherein adjacent groups of clamping dogs 12 are separated by a parking dog 13. The number of clamping dogs 12 may depend on the diameter of the flanges 21, 21a to be connected. In a prototype of a clamp 1 configured for an element 2 with a standard 13⅝" centre opening, the clamp 1 is provided with a total number of eighteen clamping dogs 12. In the prototype, the number of parking dogs 13 is three, thereby forming three groups of clamping dogs 12 as shown here for 13⅝" element centre opening. However, the number of clamping dogs 12 may be more than or less than the eighteen shown, for example twelve, fifteen, twenty-one, when three parking dogs 13 are used as shown, and equal groups of clamping dogs 12 are desired. To facilitate correct alignment between the flange 21 first entering the clamp 1 and the clamp 1 itself, at least three parking dogs 13 is preferred.

Figure 6:
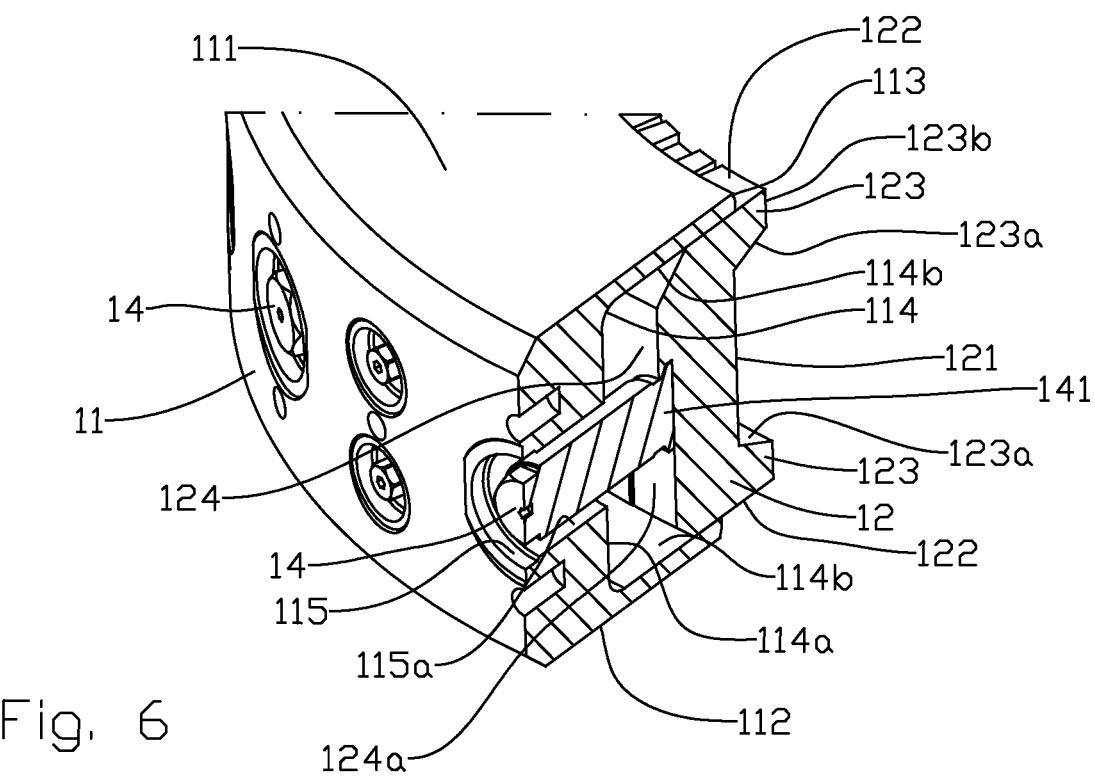
FIG. 6 shows in larger scale an axial section through a clamp body at a clamping dog.
Figure 7:
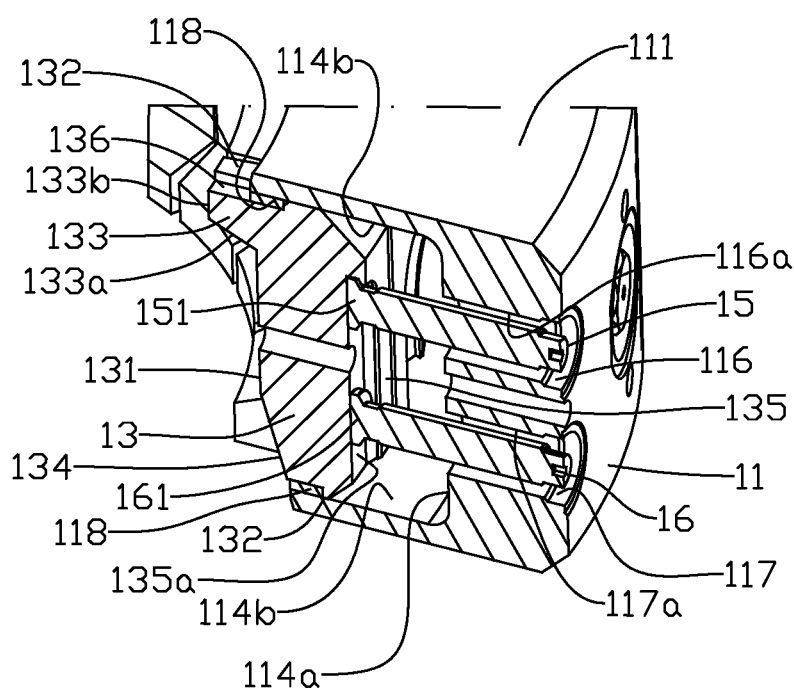
FIG. 7 shows an axial section through a clamp body at a parking dog.

It is now referred to FIGS. 6 and 7. The groove 114 is formed with a bottom 114a and two opposing, parallel sidewalls 114b extending perpendicularly from the bottom 114a to the centre opening 113 of the clamp body 11.

Each clamping dog 12 is formed to supportingly grip over a portion of first flange periphery edges 211 (see FIG. 1) of two adjacent flanges 21, 21a by end portions of a radially inwardly facing lateral side 121 being provided with two opposing protrusions 123 forming first flange supporting flats 123a slanting from said lateral side 121 towards an end portion 123b of each protrusion 123. End flats 122 of each clamping dog 12 is configured for slidingly abutting against the groove sidewalls 114b so that the clamping dogs 12 are supported by the groove sidewalls 114b.

A radially outwardly facing lateral side 124 of the clamping dog 12 is facing the groove bottom 114a and is provided with an actuator engaging portion 124a, here shown as a T-slot.

Figure 3:
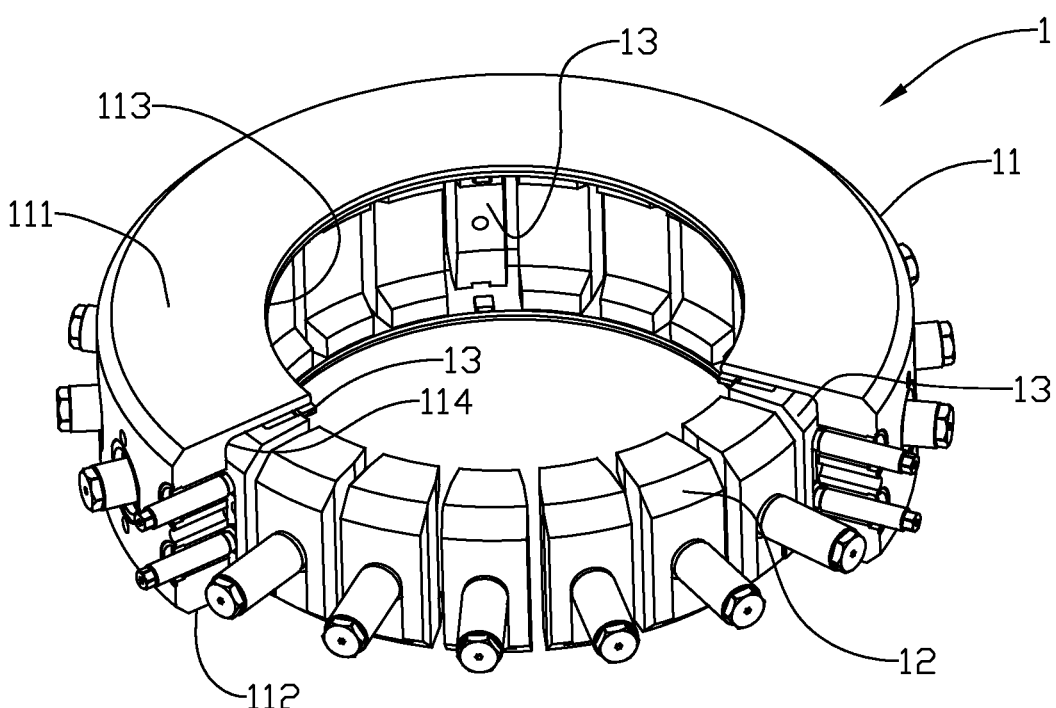
FIG. 3 shows a partly through-cut of the clamp according to the invention in an idle state.
Figure 4:
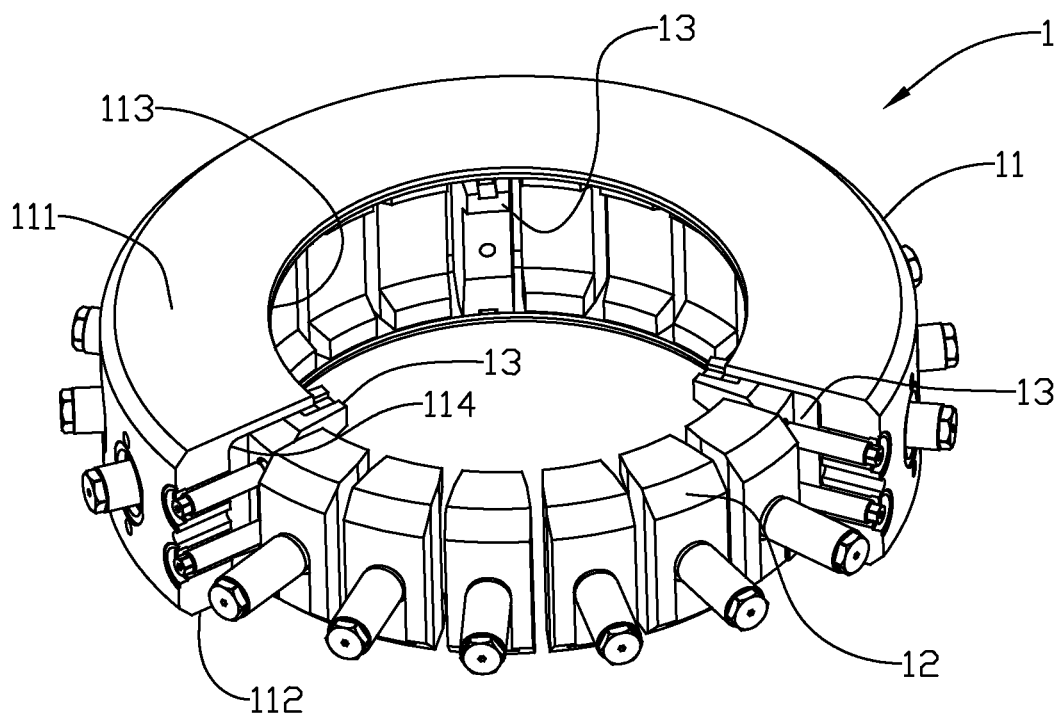
FIG. 4 shows a partly through-cut of the clamp with parking dogs in an activated state.
Figure 5:
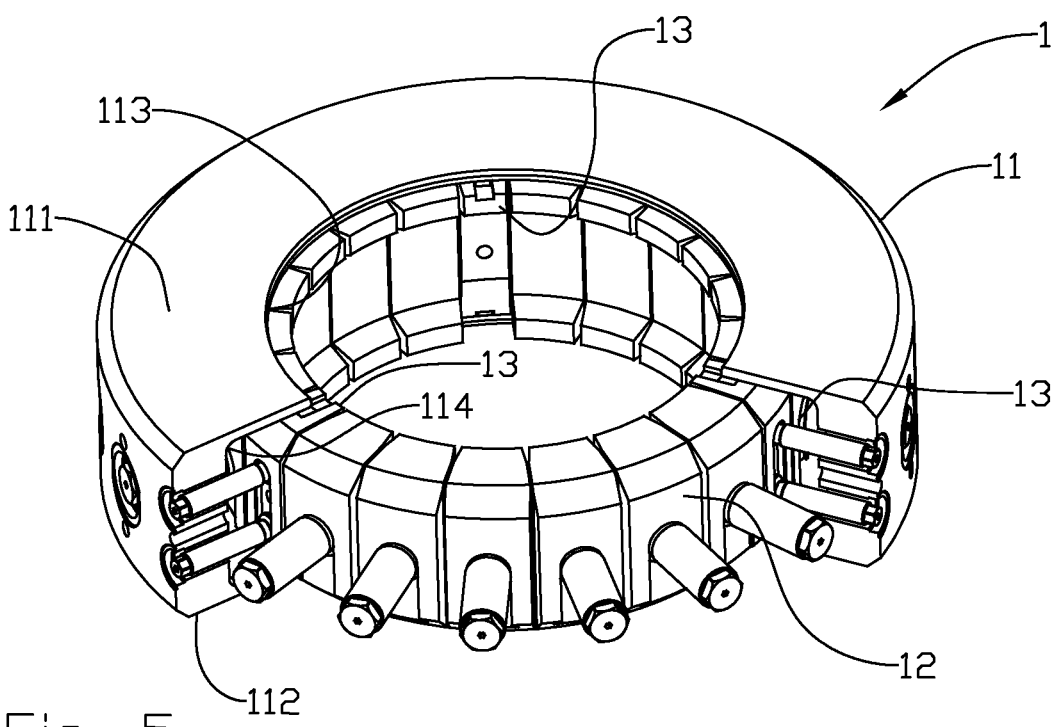
FIG. 5 shows a partly through-cut of the clamp with parking dogs and clamping dogs in an activated state.

A first linear actuator 14 is provided for each clamping dog 12 and being arranged to radially displace the respective clamping dog 12 within the groove 114 between a passive or retracted first position as shown in FIGS. 3 and 4, and an active or extended position as shown in FIGS. 2, 5, 6, and 8. Said first linear actuator 14 is in the embodiment shown a first screw engaging with internal threads 115a of a first actuator bore 115 extending between the groove bottom 114a and the periphery of the clamp body 11. The first linear actuator 14 is engaging with the actuator engaging portion 124a of the clamping dog 12, here shown as a T-shaped end portion 141 of the first screw 14 engaging with the T-slot 124a of the clamping dog 12.

In FIG. 3 are the parking dogs 13 and the clamping dogs 12 shown in the retracted or passive first position wherein the dogs 12, 13 fully accommodated within the clamp body 11. However, it should be noted that the dogs 12, 13 does not have to be fully accommodated within the clamp body 11 when being in the passive first positions. It is sufficient that the dogs 12, 13 are retracted to an extent that allows passing of the flanges 21, 21a (see FIG. 1).

Each parking dog 13 (see FIG. 7) is formed to supportingly rest on a portion of one of the two adjacent flanges 21, 21a to be connected by a first end portion of a radially inwardly facing lateral side 131 being provided with one protrusion 133 forming a second flange supporting flat 133a extending from the lateral side 131 towards an end portion 133b of the protrusion 133. End flats 132 of each parking dog 13 is configured for slidingly abutting against the groove sidewalls 114b so that the parking dog 13 is supported by the groove sidewalls 114b.

In a preferred embodiment the second flange supporting flat 133a is slanting from said lateral side 131 towards the end portion 133b of the protrusion 133.

In a preferred embodiment a slanted end portion 134 is provided at the radially inwardly facing lateral side 131 opposite the protrusion 133.

A radially outwardly facing lateral side 135 of the parking dog 13 is facing the groove bottom 114a and is provided with an actuator engaging portion 135a, here shown as a T-slot.

A second linear actuator 15 is provided for each parking dog 13, arranged to radially displace the respective parking dog 13 within the groove 114 between a passive or retracted first position as shown in FIG. 3, and an active or extended position as shown in FIGS. 2, 5, 7, and 9. Said second linear actuator 15 is preferably a second screw engaging with internal threads 116a of a second actuator bore 116 extending between the groove bottom 114a of the groove 114, and to the periphery of the clamp body 11. The second linear actuator 15 is engaging with the actuator engaging portion 135a of the parking dog 13, here shown as a T-shaped end portion 151 of the second screw 15 engaging with the T-slot 135a of the parking dog 13.

A possible third linear actuator 16 is provided for each parking dog 13, arranged to support the respective parking dog 13 when in an extended, active position. Said third linear actuator 16 is preferably identical to the second actuator 15, wherein a third screw is engaging with internal threads 117a of a third actuator bore 117 extending between the groove bottom 114a to the periphery of the clamp body 11. The third linear actuator 16 is engaging with the actuator engaging portion 135a of the parking dog 13, here shown as a T-shaped end portion 161 of the third screw 16 engaging with the T-slot 135a of the parking dog 13.

The second and third linear actuators 15, 16 are preferably arranged with end stoppers 118 preventing the parking dogs 13 from being displaced too far into the centre opening 113 of the clamp 1. In the embodiment shown in FIG. 7 the end stoppers 118 are extending from the sidewalls 114b of the groove 114 into respective oblong recesses 136 in the end flats 132 of the parking dog 13.

Figure 8:
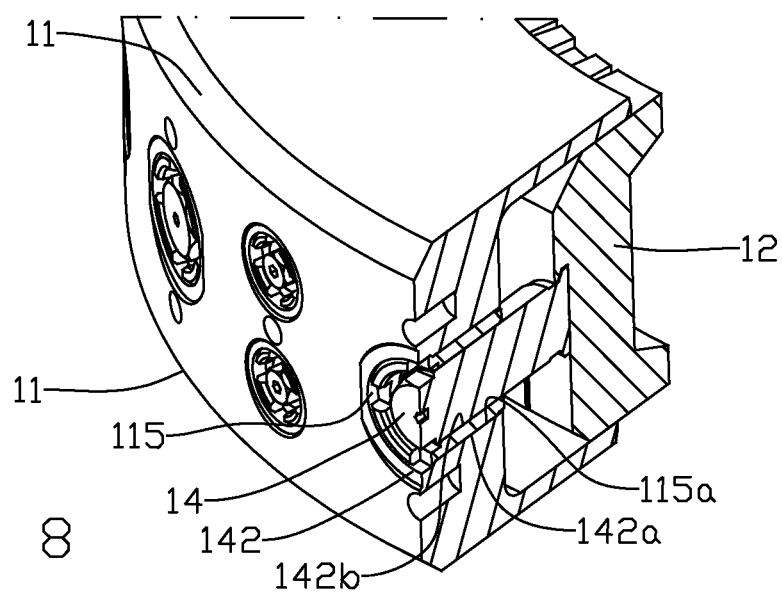
FIG. 8 shows an axial section through an alternative embodiment of a clamp body at a clamping dog.
Figure 9:
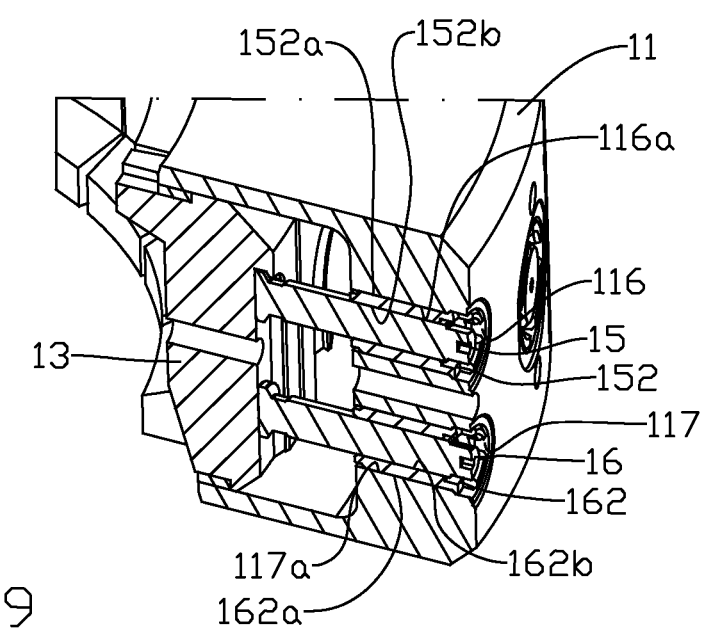
FIG. 9 shows an axial section through an alternative embodiment of a clamp body at a parking dog.

In an alternative embodiment of the clamp body 11 shown in FIGS. 8 and 9, the screws 14, 15, 16 forming the first linear actuator, the second linear actuator and the possible third linear actuator, respectively, are engaging with internal threads 142b, 152b, 162b of a first sleeve 142, a second sleeve 152 and a third sleeve 162, respectively, wherein external threads 142a, 152a, 162a of the first sleeve 142, the second sleeve 152 and the third sleeve 162, respectively, engaging with the internal threads 115a, 116a, 117a, respectively, of the first actuator bore 115, the second actuator bore 116 and the third actuator bore 117, respectively. An effect of this embodiment is that said sleeves 142, 152, 162 are replaceable in case of internal threads 142b, 152b, 162b, respectively, become damaged during the use of the clamp 1.

When an upright flanged first element 2 is to be clamped to an upright second flanged element 2a by a clamp 1 according to the present invention (see FIG. 1), the clamp 1 with all clamping dogs 12 and parking dogs 13 being in the retracted position to allow passage of the flanges 21, 21a into the clamp 1, is placed on a convenient support (a floor, a table, or the like, not shown). The clamp 1 is oriented so that the protrusions 133 of the parking dogs 13 being closer to the first flange 21 than the support, i.e., the first end portion 111 of the clamp body 11 facing the flanged first element 2. The first element 2 is lowered onto the clamp 1 with the lower, first flange 21 of the first element 2 entering the centre opening 113 of the clamp body 11. The parking dogs 13 are then displaced radially inwards to its active position by operating the second linear actuators 15 so that the parking dogs 13 engage with the first flange 21 and thereby prevent separation between the clamp 1 and the first flange 21. In the active position of the parking dogs 13 the second slanted flange supporting flats 133a of the protrusions 133 of the parking dogs 13 being arranged to lay supportingly on a first, upper flange periphery 211 of the first flange 21. If provided, the third linear actuators 16 may be used as a support for maintaining an upright position of the parking dogs 13 throughout the displacement of the parking dogs 13.

After having secured the clamp 1 with respect to the first element 2, the first element 2 is lifted carrying the clamp 1 connected to the lower, first flange 21 by the parking dogs 13. By using three parking dogs 13, the three protrusions 133 are forming a tripod providing a stable support of the clamp 1 with load evenly distributed. FIG. 1 shows this state of the clamping procedure.

The first element 2 is then lowered onto the second element 2a to which the first element 2 is to be connected. The lower portion of the centre opening 113 facing the upper, second flange 21a of the second element 2a receives the second flange 21a, the slanted end portions 134 of the parking dogs 13 facing an upper, second flange periphery edge 212 of the second flange 21, provide guidance of the first element 2 with respect to the second element 2a and thus facilitating the insertion of the second flange 21a in the clamp 1. When the first and second flanges 21, 21a mates, the clamping dogs 12 are displaced by operating the first linear actuators 14 to apply a clamping force onto the pair of flanges 21, 21a by the first slanted supporting flats 123a of the opposing protrusions 123 contacting the remote first flange periphery edges 211 of the mating flanges 21, 21a.

A disconnection of the two elements 2, 2a is done by reversing the assembly procedure described above.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements.

The invention claimed is:

1. A ring-shaped clamp arranged to encircle and hold together a pair of mating flanges of two inter-connectable elements, wherein the ring-shaped clamp comprises a body provided with a throughgoing center opening arranged to accommodate the pair of mating flanges, and the body comprises a groove formed inside the body, the groove co-axially facing the center opening,
    wherein the groove holds a number of clamping dogs arranged in groups, wherein adjacent groups of the clamping dogs are separated by a parking dog, each of the clamping dogs and each of the parking dogs being radially displaceable between a passive first position, and an active second position,
    each of the clamping dogs are provided with a pair of opposing, first slanted flange supporting flats arranged to supportingly rest on a portion of remote first flange periphery edges of the mating flanges when being in the active second position, and
    each of the parking dogs are provided with only one protrusion arranged to supportingly rest on a portion of one of the flanges when being in the active second position,
        wherein each parking dog comprises a single second flange supporting flat being slanted and arranged to supportingly rest on a portion of the first flange periphery edge of one of the flanges without the parking dog impeding axial movement of the other of the flanges.

2. The ring-shaped clamp according to claim 1, wherein each of the clamping dogs and the parking dogs are radially displaceable by individual linear actuators provided in the body.

3. The ring-shaped clamp according to claim 1, wherein the clamping dogs are arranged in at least three groups.

4. The ring-shaped clamp according to claim 1, wherein the groove comprises parallel sidewalls arranged to provide axial support to the clamping dogs and the parking dogs.

5. The ring-shaped clamp according to claim 1, wherein each of the clamping dogs and the parking dogs are radially displaceable by individual linear actuators formed by screws engaging with internal threads radial bores provided in the body.

6. The ring-shaped clamp according to claim 1, wherein each of the clamping dogs and the parking dogs are radially displaceable by individual linear actuators formed by screws engaging with internal threads in replaceable sleeves arranged in radial bores provided in the body.

7. The ring-shaped clamp according to claim 2, wherein the linear actuators comprise T-shaped end portions arranged to engage with respective T-slots provided in the clamping dogs and parking dogs.

8. The ring-shaped clamp according to claim 2, wherein each parking dog is connected to two identical linear actuators.

9. A method for clamping a first flange, forming part of a first element, to a second flange forming part of a second element, wherein the method comprises the steps:
    a) providing a clamp according to claim 1, and arranging all clamping dogs and parking dogs in their passive first position,
    b) orienting the clamp so that the protrusion of each parking dog is facing the flange to be gripped by the parking dog,
    c) joining the clamp and the element comprising the flange to be gripped by the parking dogs by entering the flange into a center opening of the body,
    d) radially displacing the parking dogs to bring the protrusion of the parking dogs to supportingly rest on a portion of the first flange,
    e) connecting the first element and the second element by entering the other one of the flanges into the center opening of the clamp body, thereby mating the first flange and the second flange, and
    f) radially displacing the clamping dogs to engagement of first slanted flange supporting flats of the clamping dogs with the remote first flange periphery edges of the mating flanges.

10. The method according to claim 9, wherein the radial displacement of the parking dogs and the clamping dogs are provided by operating individual linear actuators provided in the body.

11. The method according to claim 9, wherein the radial displacement of each parking dog is provided by operating a second linear actuator and a third linear actuator to obtain a prescribed position throughout the displacement.

12. The ring-shaped clamp according to claim 1, wherein the clamping dogs are arranged in at least two groups.

13. The ring-shaped clamp according to claim 2, wherein each of the clamping dogs and the parking dogs are radially displaceable by individual linear actuators formed by screws engaging with internal threads radial bores provided in the body.

14. The ring-shaped clamp according to claim 1, wherein each of the parking dogs are provided with a radially inwardly facing lateral side comprising:
    the only one protrusion;
    a slanted end portion opposite the one protrusion; and
    an intermediate portion extending between the slanted end portion and the only one protrusion, wherein no part of the slanted end portion extends radially inward past any part of the intermediate portion.

15. The ring-shaped clamp according to claim 4, wherein the center opening is wider at a first end of the body than at a second end of the body,
wherein each of the parking dogs are provided with a pair of opposing end flats that are arranged to slidingly abut the parallel sidewalls so that the respective parking dog is supported by the parallel sidewalls in both the passive first position and the active second position,
wherein one of the opposing end flats proximal to the first end of the body partially extends from the groove when being in the active second position, such that the one of the opposing end flats at least partially overlaps with the one of the flanges in a radial direction, and
wherein the other of the opposing end flats proximal to the second end of the body does not overlap with the one of the flanges in the radial direction when being in the active second position and does not extend into the center opening.

16. The ring-shaped clamp according to claim 1, wherein each of the clamping dogs comprises a radially inwardly facing surface having a first cross-sectional profile, and each of the parking dogs comprises a radially inwardly facing surface having a second cross-sectional profile that is different from the first cross-sectional profile.

17. The ring-shaped clamp according to claim 1, wherein each of the parking dogs accommodates axial movement of the other of the mating flanges with respect to the ring-shaped clamp in the active second position.

18. The ring-shaped clamp according to claim 1, wherein the parking dogs are arranged such that the one protrusions of the parking dogs support the entire weight of the body on the one of the flanges when the parking dogs are in the active second position and the clamping dogs are in the passive first position thereby permitting axial movement of the other of the flanges with respect to both the one of the flanges and the ring-shaped clamp.

19. A ring-shaped clamp arranged to encircle and hold together a pair of mating flanges of two inter-connectable elements,
wherein the ring-shaped clamp comprises a body provided with a throughgoing center opening arranged to accommodate the pair of mating flanges, and the body comprises a groove formed inside the body, the groove co-axially facing the center opening,
wherein the groove holds a number of clamping dogs arranged in groups, wherein adjacent groups of the clamping dogs are separated by a parking dog, each of the clamping dogs and each of the parking dogs being radially displaceable between a passive first position, and an active second position,
each of the clamping dogs are provided with a pair of opposing, first slanted flange supporting flats arranged to supportingly rest on a portion of remote first flange periphery edges of the mating flanges when being in the active second position, and
each of the parking dogs are provided with only one protrusion arranged to supportingly rest on a portion of one of the flanges when being in the active second position,
wherein each parking dog is provided with one or more end stoppers arranged to define the inwardly radial displacement of the parking dog, and each parking dog comprises an oblong recess that extends from an inward side of the parking dog, and
wherein a depth of the oblong recess defines a maximum inwardly radial displacement of the parking dog.

20. A ring-shaped clamp arranged to encircle and hold together a pair of mating flanges of two inter-connectable elements, the ring-shaped clamp comprising:
a ring-shaped clamp body having a central axis and forming a center opening extending between a first exterior side and a second exterior side of the ring-shaped clamp body along the central axis,
the ring-shaped clamp body comprising a groove formed inside the ring-shaped clamp body, the groove co-axially facing the center opening,
wherein a diameter of the center opening is arranged to accommodate the pair of mating flanges without contacting a radially outward facing surface of either of the two inter-connectable elements;
a plurality of parking dogs positioned within the groove, each of the plurality of parking dogs comprising a first side having a first end provided with a protrusion and a second end,
wherein each of the plurality of parking dogs is radially displaceable between
a passive first position in which the protrusion of the first end is arranged to accommodate the pair of mating flanges without contacting any portion of the flange of either of the two inter-connectable elements, and
an active second position in which the protrusion of the first end extends into the central opening and is arranged to supportingly engage with the flange of one of the two inter-connectable elements and the second end is arranged to accommodate the flanges of the pair of mating flanges without contacting any portion of the flange of either of the two inter-connectable elements; and
a plurality of clamping dogs positioned within the groove and arranged around at least a portion of the circumference of the center opening,
wherein each of the plurality of clamping dogs comprises:
a first side having a first end provided with a first protrusion and a second end provided with a second protrusion,
wherein each of the plurality of clamping dogs is radially displaceable between
a passive first position in which the first protrusion of the first end and the second protrusion of the second end are both arranged to accommodate the pair of mating flanges without contacting any portion of the flange of either of the two inter-connectable elements and
an active second position in which the first protrusion of the first end extends into the central opening and is arranged to supportingly engage with the flange of the one of the two inter-connectable elements and the second protrusion of the second end is arranged to supportingly engage with the flange of the other of the two inter-connectable elements.

21. The ring-shaped clamp according to claim 20,
wherein the first exterior side has a first inner diameter and a first outer diameter, and the second exterior side has a second inner diameter and a second outer diameter,
the center opening extends between the first exterior side and the second exterior side, and the first inner diameter is smaller than the second inner diameter such that the center opening is narrower at the first exterior side and wider at the second exterior side, and wherein the groove comprises:
  a first groove sidewall proximate to the first exterior side;
  a second groove sidewall proximate to the second exterior side and parallel to the first groove sidewall; and
  a groove bottom that extends between the first groove sidewall and the second groove sidewall,
    wherein the first groove sidewall extends a first radial distance radially between the groove bottom and the center opening, and
    wherein the second groove sidewall extends a second radial distance radially between the groove bottom and the center opening that is smaller than the first radial distance;

wherein each of the plurality of clamping dogs comprises:
  a first end flat arranged to slidingly abut the first groove sidewall; and
  a second end flat arranged to slidingly abut the second groove sidewall so that the respective clamping dog is supported by both the first groove sidewall and the second groove sidewall in both the passive first position and the active second position,
    wherein, while the clamping dogs are in the active second position, the first end flat extends a first distance into the center opening beyond the first groove sidewall and the second end flat extends a second distance into the center opening beyond the second groove sidewall that is greater than the first distance; and wherein each of the plurality of parking dogs comprises:
  a first end flat arranged to slidingly abut the first groove sidewall; and
  a second end flat arranged to slidingly abut the second groove sidewall so that the respective parking dog is supported by both the first groove sidewall and the second groove sidewall in both the passive first position and the active second position,
    wherein, while the parking dogs are in the active second position, the first end flat extends the first distance into the center opening beyond the first groove sidewall and the second end flat does not extend into the center opening beyond the second groove sidewall.

* * * * *